US011294853B1

(12) United States Patent
Meyers (10) Patent No.: US 11,294,853 B1
(45) Date of Patent: Apr. 5, 2022

(54) ARCHIVER FOR DATA STREAM SERVICE

(71) Applicant: Amazon Technologies, Inc., Seattle, WA (US)

(72) Inventor: Ian Matthew Gary Meyers, East Molesey (GB)

(73) Assignee: Amazon Technologies, Inc., Seattle, WA (US)

( * ) Notice: Subject to any disclaimer, the term of this patent is extended or adjusted under 35 U.S.C. 154(b) by 448 days.

(21) Appl. No.: 15/630,889

(22) Filed: Jun. 22, 2017

(51) Int. Cl.
*G06F 16/30* (2019.01)
*G06F 16/11* (2019.01)
*H04N 21/231* (2011.01)
*H04N 21/222* (2011.01)

(52) U.S. Cl.
CPC ....... *G06F 16/113* (2019.01); *H04N 21/2223* (2013.01); *H04N 21/23113* (2013.01)

(58) Field of Classification Search
CPC .. G06F 16/951; G06F 16/113; G06F 16/9535; G06F 16/248; G06F 16/285
USPC ........ 707/609, 687, 705, 769, 790, 813, 821
See application file for complete search history.

(56) References Cited

U.S. PATENT DOCUMENTS

| | | | |
|---|---|---|---|
| 9,794,135 B2 | 10/2017 | Theimer et al. | |
| 9,912,752 B1* | 3/2018 | Davis | H04L 67/1097 |
| 10,761,590 B1* | 9/2020 | Dixon | G06F 1/30 |
| 2005/0097126 A1* | 5/2005 | Cabrera | G06F 16/10 |
| 2012/0131139 A1* | 5/2012 | Siripurapu | H04L 65/60 709/217 |
| 2012/0133532 A1* | 5/2012 | Hunt | H03M 7/40 341/87 |
| 2014/0304399 A1* | 10/2014 | Chaudhary | H04L 41/5009 709/224 |
| 2019/0189167 A1* | 6/2019 | Suhler | G06F 12/0246 |

OTHER PUBLICATIONS

Amazon Web Services, "Amazon DynamoDB—NoSQL cloud Database Service," downloaded Jun. 21, 2017, from https://aws.amazon.com/, pp. 1-11.
Amazon Web Services, "Amazon Kinesis Firehose," downloaded May 26, 2017 from https://aws.amazon.com/kinesis/firehose/, pp. 1-12.
Kafka, "Kafka 0.10.2 Documentation," downloaded May 26, 2017 from http://kafka.apache.org/documentation.html#compaction, pp. 1-176.

(Continued)

*Primary Examiner* — Sana A Al-Hashemi
(74) *Attorney, Agent, or Firm* — Robert C. Kowert; Kowert, Hood, Munyon, Rankin & Goetzel, P.C.

(57) ABSTRACT

Data is obtained from a data stream managed by a data stream service prior to expiration of a data retention time. The data is archived to a data store distinct from the data stream service (e.g., in a full or compacted mode). Access to the archived data is provided via a proxy that intercepts requests directed to the streaming service. For example, the proxy or a redirect utility for the proxy may intercept a query, and for data specified in the query that is past the retention expiration time, the data is retrieved from the data store. For data specified in the query that has not yet expired, the data is retrieved from the data stream service. In either case, the system responds to the query with the retrieved data according to the access interface of the data stream service (e.g., injecting the retrieved data into a data stream).

20 Claims, 7 Drawing Sheets

(56) References Cited

OTHER PUBLICATIONS

Wayback Machine, "Log Compaction," Created by Jay Kreps, last modified by Manikumar Reddy O. on Mar. 20, 2016, downloaded May 26, 2017 from https://web.archive.org/web/20160514053104/https://cwiki.apache.org/confluence/display/kafka/log+compaction, pp. 1-4.

* cited by examiner

ARCHIVER FOR DATA STREAM SERVICE

BACKGROUND

Commoditization of computer hardware and software components has led to the rise of service providers that provide computational and storage capacity as a service. At least some of these services (e.g., managed services such as data stream services that provide publish/subscribe message transmission) provide limited data retention. For instance, service providers that provide cloud computing services receive and/or generate vast quantities of data, making long-term retention of all of the received and/or generated data prohibitive. For at least some services, service providers may not retain data at all or may retain data for a relatively short period of time (e.g., minutes, 1 hour, 24 hours, a week, etc.).

Additionally, data retained for long term storage may be difficult to access. For instance, data retained long term may be stored to a data store that exhibits relatively higher latency, or access to the retained data may be burdensome (e.g., access may require a manual process or may require custom code to integrate into a customer's system).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of systems and techniques for storing data obtained from a data stream service to a data store distinct from the data stream service, and providing access to the data via an access interface of the data stream service are disclosed. In embodiments, the data is obtained from the data stream service prior to expiration of a data retention expiration time of the data stream service, and the access interface of the data stream service provides access to the data after expiration of the data retention period of the data stream service.

In embodiments, the system may be configured to intercept requests from the requesting entity (e.g. from a user's business application) for data from the data stream service, and respond to the requests such that the data stream service appears to be responding to the requesting entity. For example, some combination of a client-side or server side query proxy may intercept a query to the data stream service and determine if the requested data is in the data stream or has been archived to the separate data store. For example, if the requested data has been archived to the separate data store, the proxy may retrieve the data from the data store service and then respond to the query directly (e.g., as if it was the data stream service) and if the data is determined to be in the data stream, the proxy may forward the query to the data stream service to respond to.

In another embodiment, the system may receive a request to restore data items from the data store into a data stream. The data stream query proxy may restore the data to the data stream service stream (e.g., inject it into the stream from the data store), in some embodiments.

Figure 1:
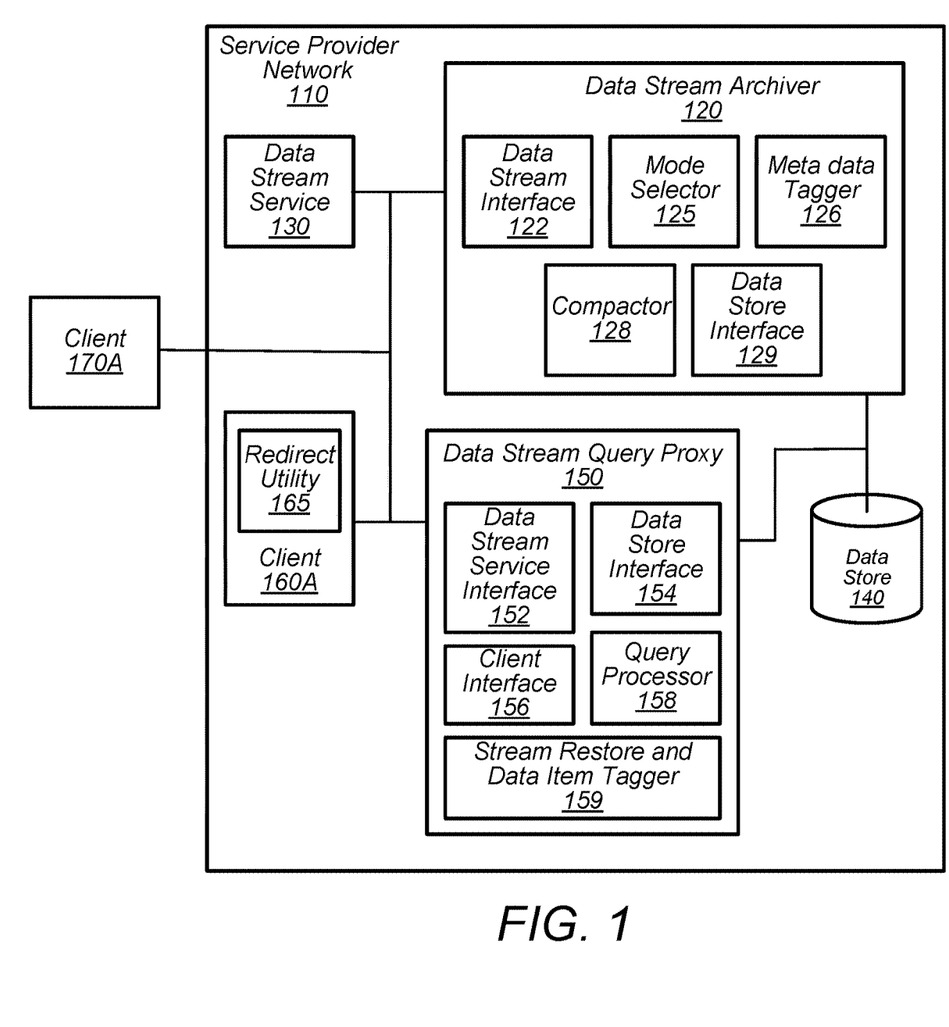
FIG. 1 depicts an example architecture of a system for archiving, compacting and accessing data from a data stream service, according to at least some embodiments.

FIG. 1 depicts an example architecture of a system for archiving, compacting and accessing data from a data stream service, according to at least some embodiments. The illustrated components of the system perform steps of the processes illustrated in FIGS. 3-6, in embodiments. For example, a data stream service 130 of service provider network 110 provides data streams of data items. The data items (e.g., events) of the data streams may be discarded subject to a data stream expiration time, or subject to some other criterion. A data stream archiver 120 may obtain the data items from the data stream prior to expiration, or prior to discard, process the data items, and store the data items to data store 140.

In embodiments, a data stream service (e.g., 130) may use criterion other than a retention expiration time for controlling the amount of data stored within the service. For instance, a data stream service may use a condition based on data item volume (e.g., the number of data items in a stream) to discard data items. In another example, a data stream service may use a condition based upon disk space in order to determine how many data items to retain and when to discard data items. For example, a data stream may only discard data when no more disk space exists. In some embodiments, the data stream archiver may obtain the data items prior to the data stream discarding the data items, irrespective of the condition used determine when to discard the data items from the data stream.

A client-side utility 165 may intercept requests to the data stream service and determine that at least some of the requested data has expired from the data stream service and is instead stored in the data store. The intercepted requests for expired data items may be forwarded to a client interface 156 of a data stream query proxy 150 that obtains the otherwise-expired data items from the data store 140 and provides access to the data items according to an access interface of the data stream service past the data retention expiration time of the data stream service (e.g., when data retention expiration is used as the condition to discard). In embodiments, the client-side utility may be a managed client, requiring only business logic from the client to perform the functionality described herein.

Figure 2:
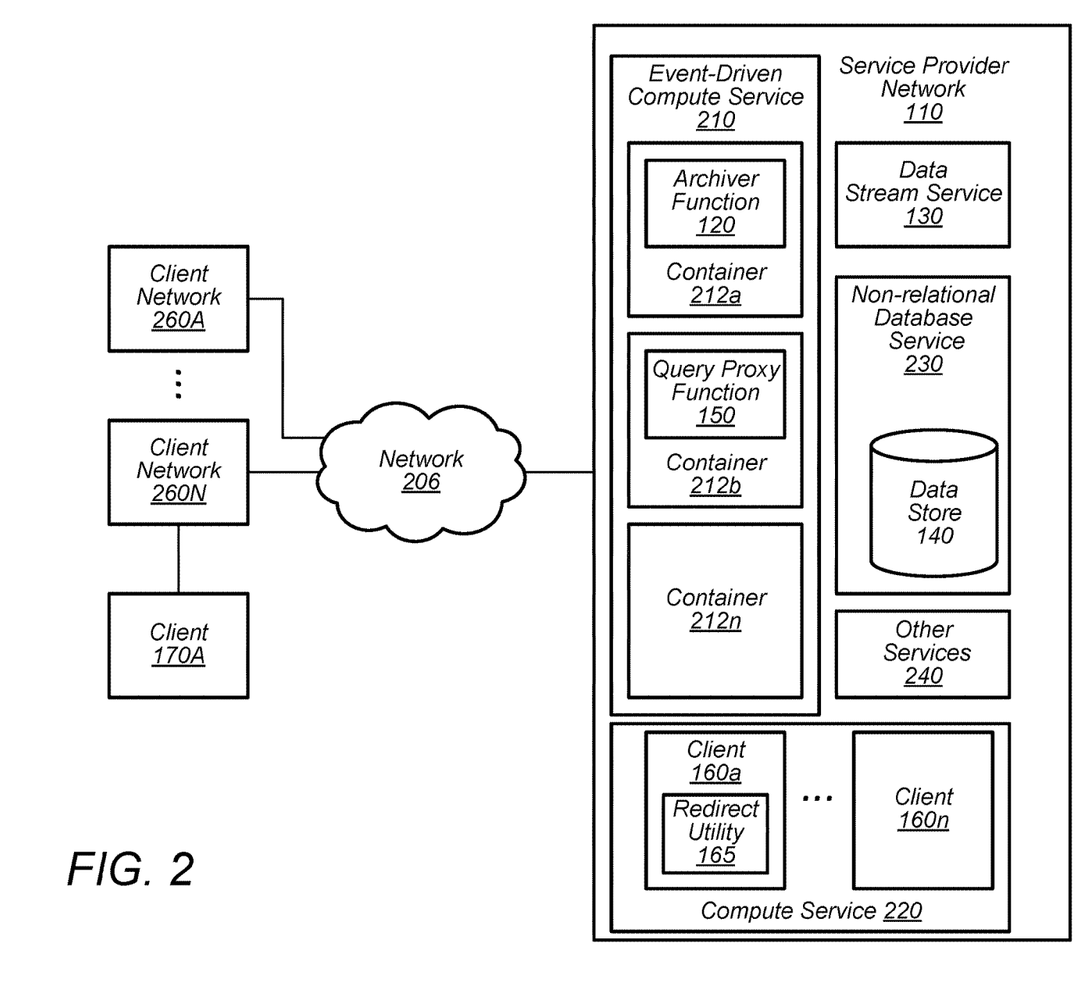
FIG. 2 depicts another architecture for an event-driven compute service that provides archiving, compacting and accessing data from a data stream service, according to at least some embodiments.

FIG. 2 depicts an architecture for an event-driven compute service that provides the archiving, compacting and accessing of data from a data stream service, according to at least some embodiments. The illustrated data stream service 130, the non-relational data base service 230, other services 240, and the event-driven compute service 210 are multi-tenant network-based services of a same provider network, in embodiments.

In embodiments, event-driven compute service 210 allows customers to run code in containers (e.g., containers 212a-212n) without provisioning or managing servers. Such an environment may be conducive to high volume, low-latency services, in embodiments. Such serverless computing environments may support a broad expanse of types of applications or backend services, executing the code and precisely scaling with high availability. In some instances, executable code in the serverless computing environment may automatically trigger from other services (e.g., 240) or when called directly (e.g., from an application).

In embodiments, the obtaining and storing of the data items are performed by an archiver function 120 executed in an event-driven compute service 210. For example, execution of the archiver function is triggered by receipt of new data items in the data stream in the data stream service, in embodiments. The archiver function 120 is terminated upon completion of the obtaining and storing of the data items, in embodiments.

The illustrated components of the system depicted in FIG. 2 perform steps of the processes illustrated in FIGS. 3-6, in embodiments. For example, a data stream service 130 of service provider network 110 provides data streams of data items. The data items (e.g., events) of the data streams may be discarded subject to a data stream expiration time, or other condition. A data stream archiver function 120 may be triggered (e.g., based on a batch of data items in a stream reaching a threshold volume, or some other trigger), may obtain the data items from the data stream prior to expiration or prior to discard, may process the data items, and may store the data items to data store 140, in embodiments.

As illustrated in FIG. 2, a client-side utility 165 (executing on any of client networks 260A-260N via network 260 or executing on any of clients 160a-160n, for example, or executing) may intercept requests to the data stream service and determine that at least some of the requested data has expired from the data stream service and is instead stored in the data store 140 of a non-relational database service 230 of the service provider network 110.

The requests may come from any source capable of making a request. In embodiments, executables, such as applications running in compute service 220, clients (e.g., external client 170A on client network 260N), other functions executing on the event-driven compute service 210, or other services 240 of service provider network 110 may be sources of the requests, for example.

The intercepted requests for expired data items may trigger execution of the query proxy function 150 in a container 212 of the event-driven compute service 210 and may be forwarded to the executing data stream query proxy function 150 that obtains the otherwise-expired data items from the data store 140 and provides access to the data items according to an access interface of the data stream service (e.g., past the data retention expiration time of the data stream service).

Figure 3:
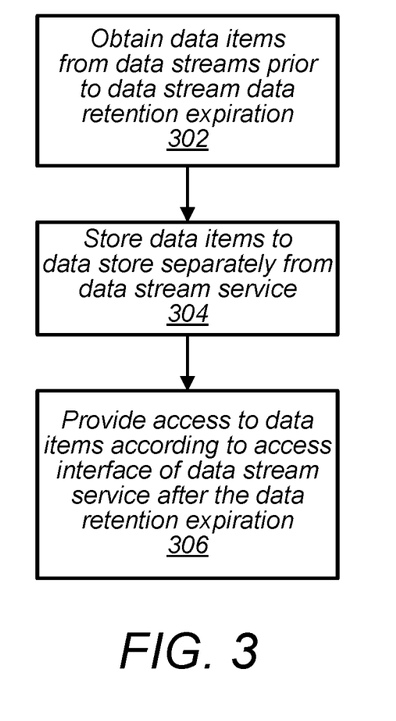
FIG. 3 illustrates a technique for archiving and accessing data from a data stream service, according to at least some embodiments.

FIG. 3 illustrates a particular technique for archiving and accessing data from a data stream service, according to at least some embodiments. The illustrated technique may be performed by a combination of hardware and/or software (e.g., FIGS. 1, 2, and 7) in various embodiments, such as by a data stream archiver 120 and a data stream query proxy 150 for instance.

Data in a data stream may be discarded by the data stream service (e.g., after the data retention expiration), in embodiments. Other conditions for discarding the data from the data stream are contemplated, without departing from the scope of this disclosure. Clients may wish to retain data items past the data stream data retention expiration. Embodiments described herein include techniques that may be implemented by a service provider such that data from a data stream may be retained (e.g., past whatever discard condition that may be implemented by the data stream service).

As illustrated in FIG. 3, data items are obtained from a data stream prior to the data stream data retention expiration (block 302). For example, data stream archiver 120 may be registered with data stream service 130 (e.g., registration makes the data stream archiver a client of the stream) to receive data items from one or more data streams. The data stream service 130 may have a default data stream data retention expiration (e.g., an hour, 24 hours, a week, etc.) which also may be configurable, in some embodiments.

As illustrated in FIG. 3, the data items are stored to a data store separately from the data stream service (block 304). For example, the data stream archiver 120 may store the obtained data items to data store 140, such as relational database in a database service, or in a non-relational database service, or the like, etc. (other data stores are contemplated without departing from the scope of the disclosure). The data stream archiver 120 may store the data items as the data items were received, in embodiments. Storage of the data items in their received form may facilitate injection of the data items back into a data stream, in embodiments (e.g., to simulate loads, to replay a situation, to put a system back into a prior state, to recover the system when the system was unable to recover prior to the data retention expiration, etc.). Although the data items may be stored as received from the data stream (e.g., in an original format), the data items may be stored along with meta data added to the data items by the data stream archiver 120. For example, the data items may be stored along with meta data describing a time stamp, a partition key, a processing mode, etc.

The system provides access to the stored data items according to an access interface of the data stream service past the data retention expiration of the data stream service (block 306). For example, clients that select to archive items from the data stream service 130 (as described in one or more embodiments described herein) may also want to access the stored data in a similarly transparent fashion. The system may be configured to provide such functionality by being configured to respond to the requests such that the streaming service appears to be responding to the requesting entity. Such functionality supports various use cases, such as replaying a stream of otherwise expired data, or a discarded portion of a stream of data, to rebuild a latest state of a system by replaying the latest version of every event that ever happened on a stream, for example (e.g., in the compaction mode). In some embodiments, the system may be configured to actually replay every event that ever happened in the stream (e.g., in the full stream data retention mode) or may be configured to select particular events (e.g., events particular to a customer or client account, events from a particular time period, events from a particular source, or the like, etc.). For example, the query may specify the particular characteristics used to reduce the amount of returned data.

Figure 4:
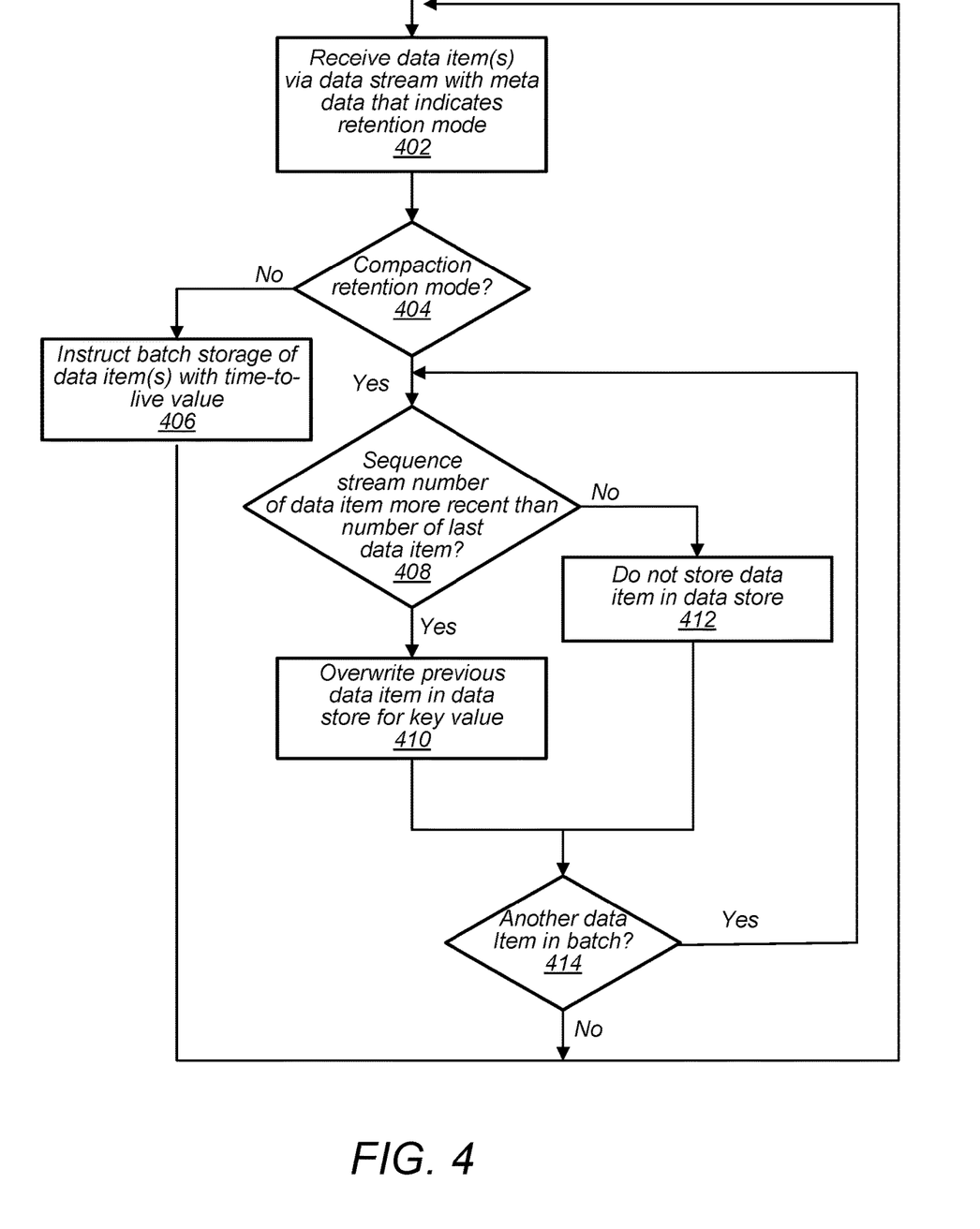
FIG. 4 illustrates a technique for archiving and compacting data from a data stream service, according to at least some embodiments.

FIG. 4 illustrates a technique for archiving and compacting data from a data stream service, according to at least some embodiments. Compacting the data may reduce the amount of data stored, by reducing storage from every event of the data stream to only the latest event for a particular key or entry in the table, in embodiments. The techniques illustrated in FIG. 4 may be performed by components of data stream archiver 120, in embodiments.

In embodiments, the process illustrated in FIG. 4 may be triggered based on a number of different events, such as batch size in the data stream, based on a time period, based on receipt of a data item, or some other event or criterion, for example.

In at least some embodiments illustrated herein (e.g., FIG. 2) an archiver function 120 registers with one or more data streams and is triggered to execute in an event-driven compute service 210 that processes a batch of data items from the data stream(s) (e.g., as illustrated in FIG. 4). Any of various triggers may be implemented (e.g., time-based, data-item volume-based, based on receipt of a data item, etc.). An archiver function may process data from more than one stream, in embodiments.

Data item(s) are received via data stream of a data stream service along with meta data that indicates a retention mode (block 402). For instance, a batch of events may be received via data stream interface 122 of data stream archiver 120. Various forms of meta data may be received along with the batch of events (e.g., both stream level and data item-level meta data granularity are contemplated, in embodiments). For instance, data items or events may be received along with a corresponding partition key, and/or a time stamp, and/or a data stream sequence number. In embodiments, meta data corresponding to the stream or to data items may include meta data that instructs the data stream archiver how to function or how to process the data items or the entire data stream. For example, meta data indicating a processing mode may be included as stream-level or data-item-level meta data (e.g., log compaction mode, or full-retention mode). The data stream service may support tagging of the data streams, in embodiments.

Block 404 illustrates that the data stream archiver may determine whether to process the data items in a compaction retention mode. For example, a mode selector 125 may determine the operational mode. The mode may be determined in a number of various ways, from meta data of the data stream or meta data of a date items from the stream, in embodiments.

If the data items are not to be processed in a compaction retention mode (but rather in a full retention mode, for example), the data stream archiver may instruct a batch storage of the data items, each with a time-to-live value (TTL) (block 406). For instance, the data store 140 may support tagging of data items and a meta data tagger 126 or the data store may add a time-to-live tag to data items (or at a batch-level, in embodiments) to items stored in the data store. The meta data tagger 126 may add other tags, such as the original partition key associated with the data item, time stamps, data stream sequence numbers, etc. In embodiments, the meta data tagger 126 may add meta data to the data items while the data item (e.g., a message body) is stored to the data store in the same condition it was received (in an originally received format). The data items may be stored to the data store 140 via data store interface 129 (e.g., an API (application program interface) that supports puts and queries, etc.), in embodiments. The data store (e.g., a managed, multi-tenant database service) may be configured to discard the data in accordance with the time-to-live tag, in embodiments. In some embodiments where the system operates in a full stream retention mode, the system may perform a batch put of the items received from the data stream as a batch.

As indicated above, the system may also operate in a compaction mode. For example, data streams may produce large quantities of data, in embodiments. While clients may want to save data, long term storage of all of the data in a data stream service may be prohibitive. One solution may be to write data (e.g., event records) from the data stream to a data store distinct from the data stream, but retain only the latest record. For example, only retaining the latest record by data stream sequence number, for a record partition key (e.g., creating a compacted log of the events or data from the stream). Such a retention scheme may facilitate retention of a "latest picture" of all events that happened on the stream from when the data stream archiver started archiving the data, in embodiments.

The data stream archiver 120, or the data store selected to store the data may be configured to ensure the integrity of data stored in the compaction mode. For example, if the mode selector 125 determines that the data is to be processed in a compaction mode, (block 404, yes) it is determined whether a data stream sequence number of a particular item is more recent than a sequence number of the last data item (block 408). In at least the depicted embodiment, compactor 128 compares the data stream sequence numbers to determine which data item is the most up-to-date. If the data item from the batch is not more recent than the corresponding data item in the data store (block 408, no) the data item from the batch is not stored in the data store (block 412). Such functionality may be performed by the compactor 128 if the data store does not support a conditional update feature of its' own, for example. Such a scheme may prevent out of order data items from corrupting the integrity of the stored data, in embodiments. In embodiments, such functionality may be performed by the data store (e.g., as a conditional update feature of the data store).

When the data stream sequence number for the data item from the batch is more recent than the last data item (block 408, yes) the data stream archiver 120 (or the data store 140) may perform a conditional update of the stored data item (e.g. instructing the data store to use a conditional update feature of the data store to update the entry in the data store with the data item from the data stream). For instance, block 410 illustrates that the system overwrites the previous data item in the data store for the key value associated with the data item from the data stream batch. Individual data items of the batch may be processed (block 414, yes) until the entire batch of data items has been processed (block 414, no), in embodiments. Time-to-live tags may be added or updated for the data items that are updated in the data store using the conditional update, in embodiments.

In embodiments, a conditional update to the data store is based on a key value and a stream sequence number for a data item of the data items. A conditional update may be carried out in the following manner, in embodiments. The system may use the data item to overwrite a previous data item in the data store for the corresponding key value if the data item has a more recent stream sequence number than the previous data item. In embodiments, the data item is not stored in the data store if the data item has an older stream sequence number than the previous data item. The conditional update may be a feature of the data store such that the data stream archiver 120 need only call upon the conditional update feature of the data store when performing the update, instead of the data stream archiver performing the conditional update process itself.

In at least the depicted embodiment, irrespective of the outcome (e.g., store the batch of data with time-to-live tags, or handle individual data items of the batch based on corresponding sequence numbers until all data of the batch is processed) the technique may start over again at 402, where another batch of data items are received from the data stream (e.g., when triggered).

Figure 5:
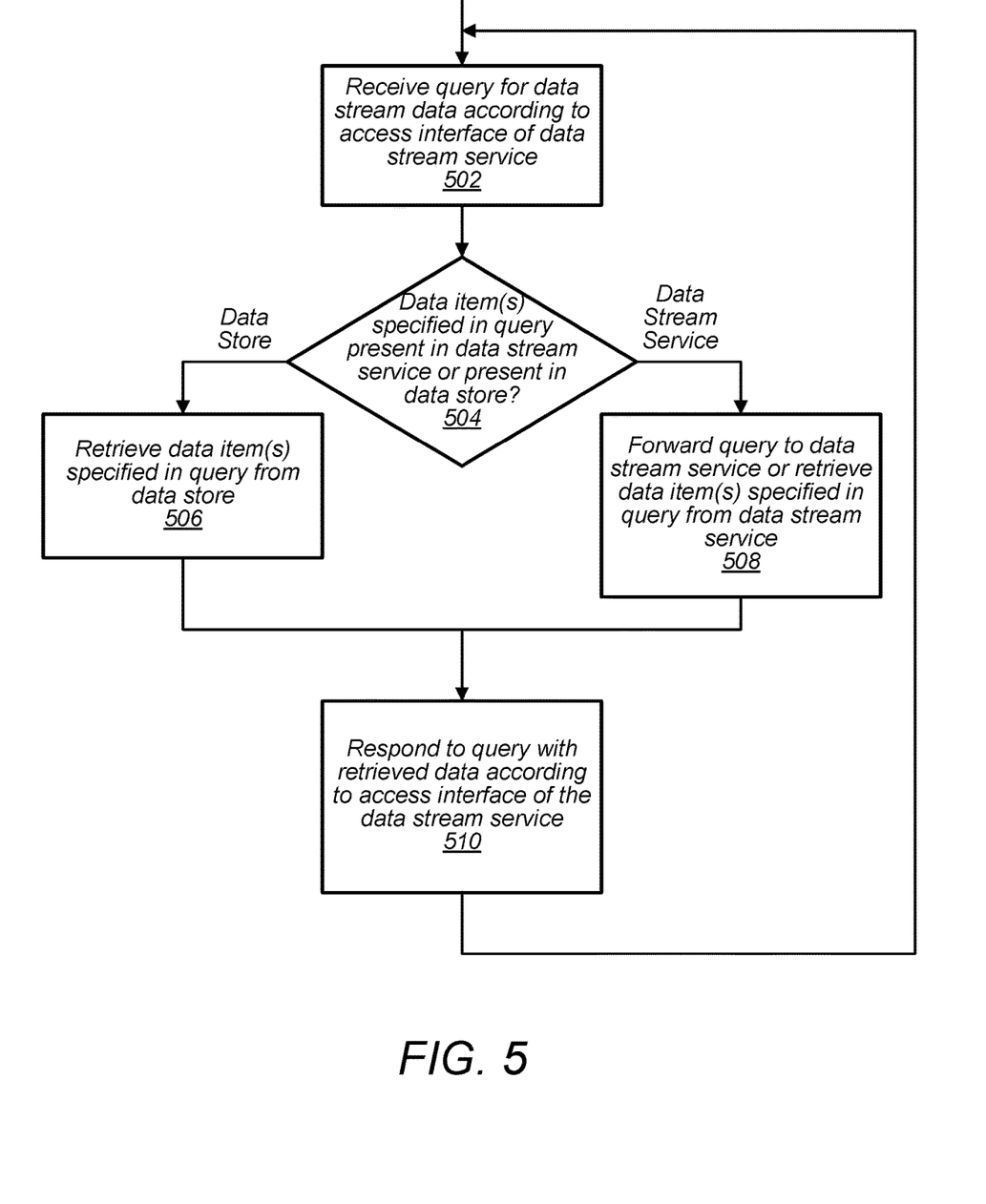
FIG. 5 illustrates a technique for responding to a request for data in a data stream via a query proxy, according to at least some embodiments.

FIG. 5 illustrates a technique for responding to a request for data in a data stream via a query proxy, according to at least some embodiments. The data requested may be data that was stored in the data store in accordance with the techniques illustrated in FIG. 4, in embodiments.

A query for data from a data stream is received according to an access interface of the data stream service (block 502). The source of the query may be any entity capable of producing a query. For example, a client (e.g., an executing application operated on a service provider network client or host 160A behalf of a client by the service provider, a test application, a client application executing on a computing device 170A external to the service provider, an application executing on another service provider network, etc.) may send a query for data stream data to data stream service 130 via an API (application program interface) of the data stream service.

In at least the illustrated embodiment in FIG. 1, a redirect utility 165, executing on the client (e.g., client 160A or client 170A or some other client, such as an application running on a host of the provider network, etc.) may intercept the request by the client to the data stream service and redirect the request to data stream query proxy 150 via a client interface 156.

In at least some embodiments illustrated herein (e.g., FIG. 2) the redirect utility 165 recognizes a request for data that is not in the data stream (e.g., is past an expiration or has otherwise been discarded by the data stream service) and triggers a query proxy function 150 to execute in an event-driven compute service 210 that processes the request (e.g., as illustrated in FIG. 5).

In some embodiments, (not illustrated) the redirect utility 165 itself may perform some of the steps described herein to process the query redirect. In the illustrated embodiment in FIG. 1, the client interface 156 receives the redirected query from the redirect utility 165, and the query processor 158 determines whether data items specified in the query are present in the data stream in the data stream service 130 or a present in the data store 140 (block 504). The client-side utility 165 may intercept calls to the data stream service (e.g., at the source of the business logic or application making the request) and looks for situations where a restoration of the data from the data store archive 140 is necessary (e.g., when the request includes a query for data items that have expired or otherwise been discarded from the data stream, but are retained in the data store 140).

For data items determined to be in the data store (block 504, data store) the data items specified in the query are retrieved from the data store (block 506). For example, the query processor 158 may query the data store 140 via the data store interface 154 to obtain the data items. The data items may be provided directly to the client 160A, instead of to the data stream, in embodiments.

In embodiments, for data items determined to be in a data stream of the data stream service, the data items specified in the query are retrieved from the data stream service (block 508). For instance, the data stream service interface 152 of the data stream query proxy may forward the query to the data stream service 130, such that the data stream service responds directly to the querying client 160A via the access interface of the data stream service 130. In some embodiments, the data stream query proxy 150 may query the data stream service for the data, receive the queried data, and provide the data items to the client (or to the redirect utility 165).

In either case, the system responds to the query with the retrieved data according to the access interface of the data stream service (block 510), in embodiments. An example access interface includes at least a stream-like API layer in front of a database query interface, in embodiments. For queries that are forwarded by the query processor 158 to the data stream service 130 (e.g., block 508), the data stream service may respond directly back to the source of the query, in embodiments.

Figure 6:
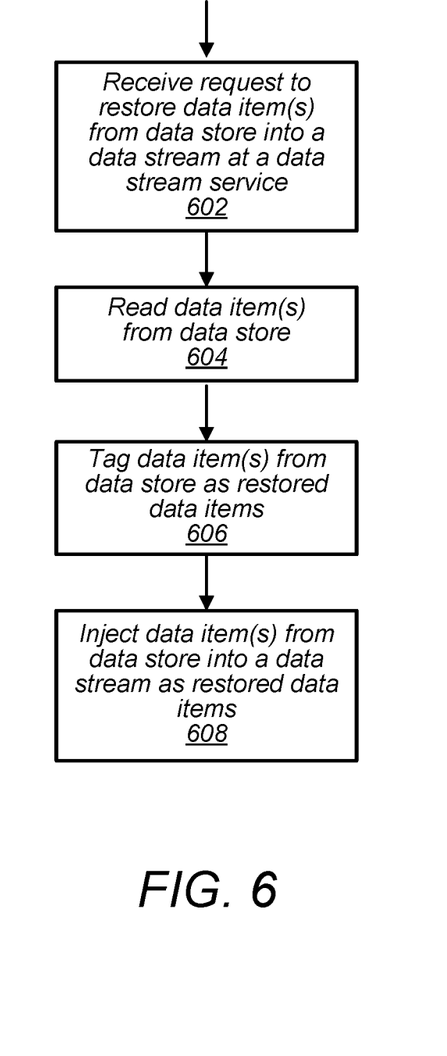
FIG. 6 illustrates a technique for responding to a request to restore the archived data into a data stream, according to at least some embodiments.

FIG. 6 illustrates a technique for responding to a request to restore the archived data into a data stream, according to at least some embodiments. The technique may be performed by various components of a data stream queue proxy 150, in embodiments. The technique may be used to make a pass over data that did not otherwise make it into the system (e.g., because the system went down). In embodiments, the techniques disclosed herein may be used for a client to access the data directly from the data stream service, despite the data having expired from the data service.

A request to restore data item(s) from a data store into a data stream at a data stream service is received (block 602). For example, query processor 158 of the data stream query proxy 150 may receive a request from either of the client 160A (directly) or from the redirect utility 165 (indirectly). The request may include characteristics of the data items to be queried, such as a time of the oldest data item to start from, or a time period for the requested data items, or the request may limit the data items based on characteristics of the data items, such as by a particular account, etc. Such characteristics may be used to limit the amount of data items returned to the query source, for example.

The requested data items are read from the data store (block 604). For instance, the query processor 158 may query the data store 140 via data store interface 154 (e.g., a database standard query language or the like).

Data items from the data store may be tagged as restored data items (block 606), by the stream restore and data item tagger 159 (for example, data items may be tagged with a time associated with the data item, such as the time the data item was received at the data stream (e.g., an original receipt time). Data items from the data store are thereby injected into a data stream as restored data items (block 608). For example, data stream service interface 152 may inject the tagged data items into a data stream at data stream service 130 (e.g., the same data stream the data items came from, or another data stream). Being tagged as a restored data item indicates that the data item has been in a stream before, in embodiments. A data item tagger (e.g., similar to stream restore and data item tagger 159) may be included in the redirect utility on the client, in embodiments. In at least some embodiments, the data stream service may assign new sequence numbers to the data items from the data store when injected into the data stream.

In embodiments, a client (e.g., an application) reads the injected data items from the data stream with the tags as "restored data." The application may treat the restored data differently from the other data of the data stream, in embodiments. For example, the application may read the data items, and update the system based on the data items, but not send notifications based on the data items.

Illustrative System

Figure 7:
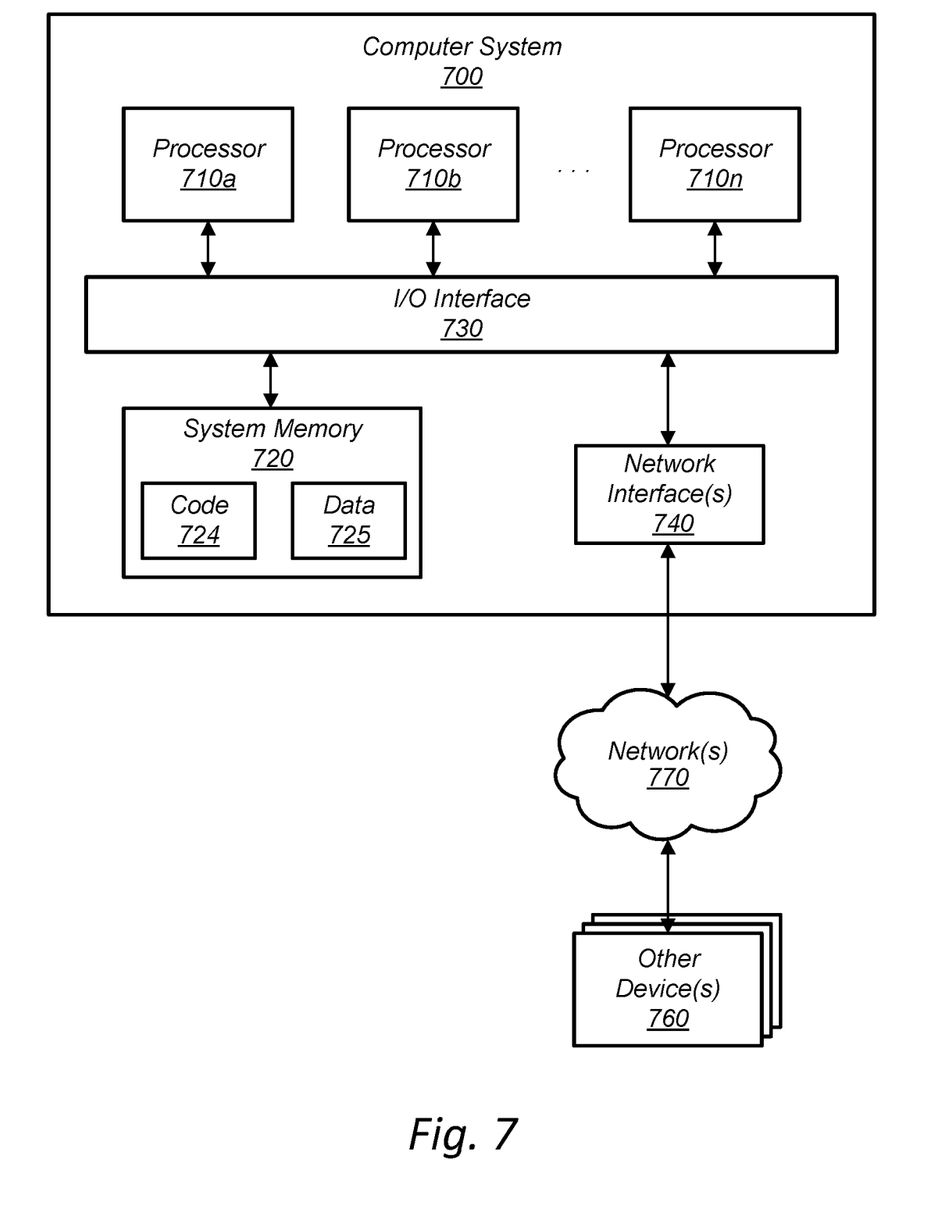
FIG. 7 is a block diagram illustrating an example computer system that may be used in some embodiments.

Any of various computer systems may be configured to implement processes associated with archiving, compacting and providing a query proxy for a data stream service. For example, FIG. 7 is a block diagram illustrating one embodiment of a computer system suitable for implementing some or all of the techniques and systems described herein. For example, each of the computer systems may host one or more respective containers 212a-212n of an event-driven compute service. In some cases, a host computer system may host multiple containers. However, the techniques described herein may be executed in any suitable computer environment (e.g., a cloud computing environment, as a web service, in an enterprise environment, etc.).

In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable applications, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 720 as program instructions 724. In some embodiments, system memory 720 may include data 725 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between a client device (e.g., 160/170) and other computer systems, or among hosts, for example. In particular, network interface 740 may be configured to allow communication between computer system 700 and/or various other device 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.7, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of:

personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the archive, compactor and query proxy for data stream service, other various services, data stores, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
 a data stream archiver configured to:
  obtain one or more data items from a data stream managed by a data stream service prior to discard of the one or more data items from the data stream service, wherein the data stream service is a network-based service that stores a plurality of different data streams for a plurality of clients over a network, and wherein the data stream service retains individual data items in the data stream for a data retention time period having a respective data retention expiration time relative to when the individual data items were respectively stored at the data stream service, and after which one or more of the data items are not guaranteed to be accessible from the data stream service; and
  store the one or more data items from the data stream to a data store separate from the data stream service; and
 a data stream query proxy configured to:
  receive a query for a given data item of the one or more data items according to an access interface of the data stream service;
  determine, based on whether the query is received before or after the data retention expiration time for the given data item, to provide access to the given data item in either the data stream managed by the data stream service or in the data store;
  provide access to the given data item in the data stream managed by the data stream service according to the access interface of the data stream service before the data retention expiration time of the data stream service for the given data item; and
  provide access to the given data item in the data store according to the access interface of the data stream service after the data retention expiration time.

2. The system as recited in claim 1, wherein the data stream archiver is further configured to:
 determine an archive mode for the data stream, wherein the archive mode is a stream compaction mode or a full stream retention mode; and
 perform said store the one or more data items from the data stream to the data store according to the determined archive mode.

3. The system as recited in claim 2, wherein to perform said store the one or more data items from the data stream to the data store, the data stream archiver is further configured to:
 perform a conditional update to the data store based on a key value and a stream sequence number for a data item of the one or more data items, wherein performance of the conditional update comprises:
  overwrite, with the data item, a previous data item in the data store for the key value if the data item has a more recent stream sequence number than the previous data item, or
  do not store the data item in the data store if the data item has an older stream sequence number than the previous data item.

4. The system as recited in claim 1, wherein to provide access to the one or more data items the data stream query proxy is further configured to:
 receive a query for the data stream according to the access interface of the data stream service;
 determine, based on the data retention expiration time of the data stream service, whether data items specified in the query are present in the data stream in the data stream service or are present in the data store; and
 retrieve the data items specified in the query from the data stream service if the data items are determined to be present in the data stream in the data stream service, or
 retrieve the data items specified in the query from the data store if the data items are determined to be present in the data store.

5. The system as recited in claim 1, wherein to provide access to the one or more data items the data stream query proxy is further configured to:
 receive a request to restore one or more data items from the data store into the data stream at the data stream service;
 read the one or more data items from the data store; and
 inject the one or more data items from the data store into the data stream at the data stream service.

6. A method, comprising:
 providing access, according to an access interface of a network-based data stream service that stores a plurality of different data streams for a plurality of clients over a network and that retains individual data items in a data stream managed by the data stream service for a data retention time period having a respective data retention expiration time relative to when the individual data items of the data stream were respectively stored, to a plurality of data items from the data stream managed by the data stream service prior to the data retention expiration time of the data stream service after which one or more of the data items are not guaranteed to be accessible from the data stream service;

obtaining the one or more of the plurality of data items from the data stream prior to the data retention expiration time;

storing the one or more data items to a data store separate from the data stream service;

receiving a query for a given data item of the one or more data items according to the access interface of the network-based data stream service;

determining, based on whether the query is received before or after the data retention expiration time for the given data item, to provide access to the given data item in either the data stream managed by the data stream service or in the data store; and providing access to the given data item according to the access interface of the data stream service after the data retention expiration time of the data stream service for the given data item.

7. The method as recited in claim 6, further comprising:
determining an archive mode for the data stream, wherein the archive mode is a stream compaction mode or a full stream retention mode; and
wherein said storing the one or more data items is performed according to the determined archive mode.

8. The method as recited in claim 7, wherein the determined archive mode is the stream compaction mode, and said storing the one or more data items comprises:
performing a conditional update to the data store based on a key value and a stream sequence number for a data item of the one or more data items, wherein according to the conditional update:
the data item overwrites a previous data item in the data store for the key value if the data item has a more recent stream sequence number than the previous data item, or
the data item is not stored in the data store if the data item has an older stream sequence number than the previous data item.

9. The method as recited in claim 7, wherein the determined archive mode is the full stream retention mode, and said storing the one or more data items comprises:
storing each of the one or more data items to the data store according to a time-to-live value, wherein each data item from the stream is archived in the data store at least for a length of time specified by the time-to-live value.

10. The method as recited in claim 6, wherein said providing access to the one or more data items comprises:
receiving a query for the data stream according to the access interface of the data stream service;
determining, based on the data retention expiration time of the data stream service, whether data items specified in the query are present in the data stream in the data stream service or are present in the data store; and
retrieving the data items specified in the query from the data stream service if the data items are determined to be present in the data stream in the data stream service, or retrieving the data items specified in the query from the data store if the data items are determined to be present in the data store.

11. The method as recited in claim 10, further comprising responding to the query with the retrieved data items according to the access interface of the data stream service.

12. The method as recited in claim 6, further comprising:
receiving a request to restore one or more data items from the data store into the data stream at the data stream service;
reading the one or more data items from the data store; and
injecting the one or more data items from the data store into the data stream at the data stream service.

13. The method as recited in claim 12, wherein the data stream service assigns new sequence numbers to the one or more data items from the data store when injected into the data stream, the method further comprising:
tagging the one or more data items from the data store as restored data items when injected into the stream.

14. The method as recited in claim 6, wherein said obtaining and said storing are performed by an archiver function executed in an event-driven compute service, wherein execution of the archiver function is triggered by receipt of one or more new data items in the data stream in the data stream service, and wherein the archiver function is terminated upon completion of said obtaining and said storing.

15. The method as recited in claim 14, wherein the data stream service, the data store, and the event-driven compute service are multi-tenant network-based services of a same provider network.

16. A non-transitory computer readable storage medium storing program instructions that, when executed by a computer, cause the computer to perform:
providing access, according to an access interface of a network-based data stream service that stores a plurality of different data streams for a plurality of clients over a network and that retains individual data items in a data stream managed by the data stream service for a data retention time period having a respective data retention expiration time relative to when the individual data items of the data stream were respectively stored, to a plurality of data items from the data stream managed by the data stream service prior to the data retention expiration time of the data stream service after which one or more of the data items are no longer guaranteed to be accessible from the data stream service;

obtaining the one or more data items from the data stream prior to the data retention expiration time;

storing the one or more data items to a data store separate from the data stream service;

receiving a query for a given data item of the one or more data items according to the access interface of the network-based data stream service;

determining, based on whether the query is received before or after the data retention expiration time for the given data item, to provide access to the given data item in either the data stream managed by the data stream service or in the data store; and providing access to the given data item according to the access interface of the data stream service after the data retention expiration time of the data stream service for the given data item.

17. The non-transitory computer readable storage medium of claim 16, wherein the program instructions cause the computer to further perform determining, based at least in part on one or more stream tags, an archive mode for the data stream, wherein the archive mode is a stream compaction mode or a full stream retention mode; and wherein said storing the one or more data items is performed according to the determined archive mode.

18. The non-transitory computer readable storage medium of claim 16, wherein the program instructions cause the computer to further perform:

receiving a request to restore one or more data items from the data store into the data stream at the data stream service;

reading the one or more data items from the data store;

injecting the one or more data items from the data store into the data stream at the data stream service, wherein the data stream service assigns new sequence numbers to the one or more data items from the data store when injected into the data stream; and tagging the one or more data items from the data store as restored data items when injected into the stream.

19. The non-transitory computer readable storage medium of claim 16, wherein said obtaining and said storing are performed by an archiver function executed in an event-driven compute service, wherein execution of the archiver function is triggered by receipt of one or more new data items in the data stream in the data stream service, and wherein the archiver function is terminated upon completion of said obtaining and said storing.

20. The non-transitory computer readable storage medium of claim 19, wherein the data stream service, the data store, and the event-driven compute service are multi-tenant network-based services of a same provider network.

* * * * *